United States Patent
Suzuki

(10) Patent No.: US 6,314,442 B1
(45) Date of Patent: Nov. 6, 2001

(54) FLOATING-POINT ARITHMETIC UNIT WHICH SPECIFIES A LEAST SIGNIFICANT BIT TO BE INCREMENTED

(75) Inventor: Hiroaki Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/218,076

(22) Filed: Dec. 22, 1998

(30) Foreign Application Priority Data

Jun. 19, 1998 (JP) .................................................. 10-173127

(51) Int. Cl.⁷ ......................................................... G06F 7/38
(52) U.S. Cl. .............................................................. 708/497
(58) Field of Search ................................... 708/497–498, 708/551–552

(56) References Cited

U.S. PATENT DOCUMENTS

| | | | |
|---|---|---|---|
| 4,839,846 * | 6/1989 | Hirose et al. ........................ | 708/497 |
| 5,258,943 * | 11/1993 | Gamez et al. ....................... | 708/497 |
| 5,303,175 * | 4/1994 | Suzuki ................................. | 708/497 |
| 5,511,016 * | 4/1996 | Be'chade ............................ | 708/497 |
| 5,568,412 * | 10/1996 | Han et al. ............................ | 708/497 |
| 5,696,711 * | 12/1997 | Makineni ............................. | 708/497 |

FOREIGN PATENT DOCUMENTS

| | | |
|---|---|---|
| 60-97436 | 5/1985 | (JP) . |
| 3-218518 | 9/1991 | (JP) . |
| 6-44048 | 2/1994 | (JP) . |

\* cited by examiner

*Primary Examiner*—Tan V. Mai
(74) *Attorney, Agent, or Firm*—Oblon, Spivak, McClelland, Maier & Neustadt, P.C.

(57) ABSTRACT

An object is to obtain a floating-point arithmetic unit with improved throughput. The floating-point arithmetic unit comprises a mantissa adder-subtracter portion (MAP) for performing arithmetic operation of mantissa data (A, B) in floating-point data, an increment portion (INP) for performing increment to a bit in the arithmetic result (D) which corresponds to the LSB when it is assumed that the MSB in the arithmetic result (D) is not shifted, a round-off decision portion (RJP) for deciding whether to round up the bit one place lower than the LSB, and a selector (S1) for selectively outputting the arithmetic result from the increment portion (INP) or the arithmetic result (D) from the mantissa adder-subtracter portion (MAP).

8 Claims, 13 Drawing Sheets

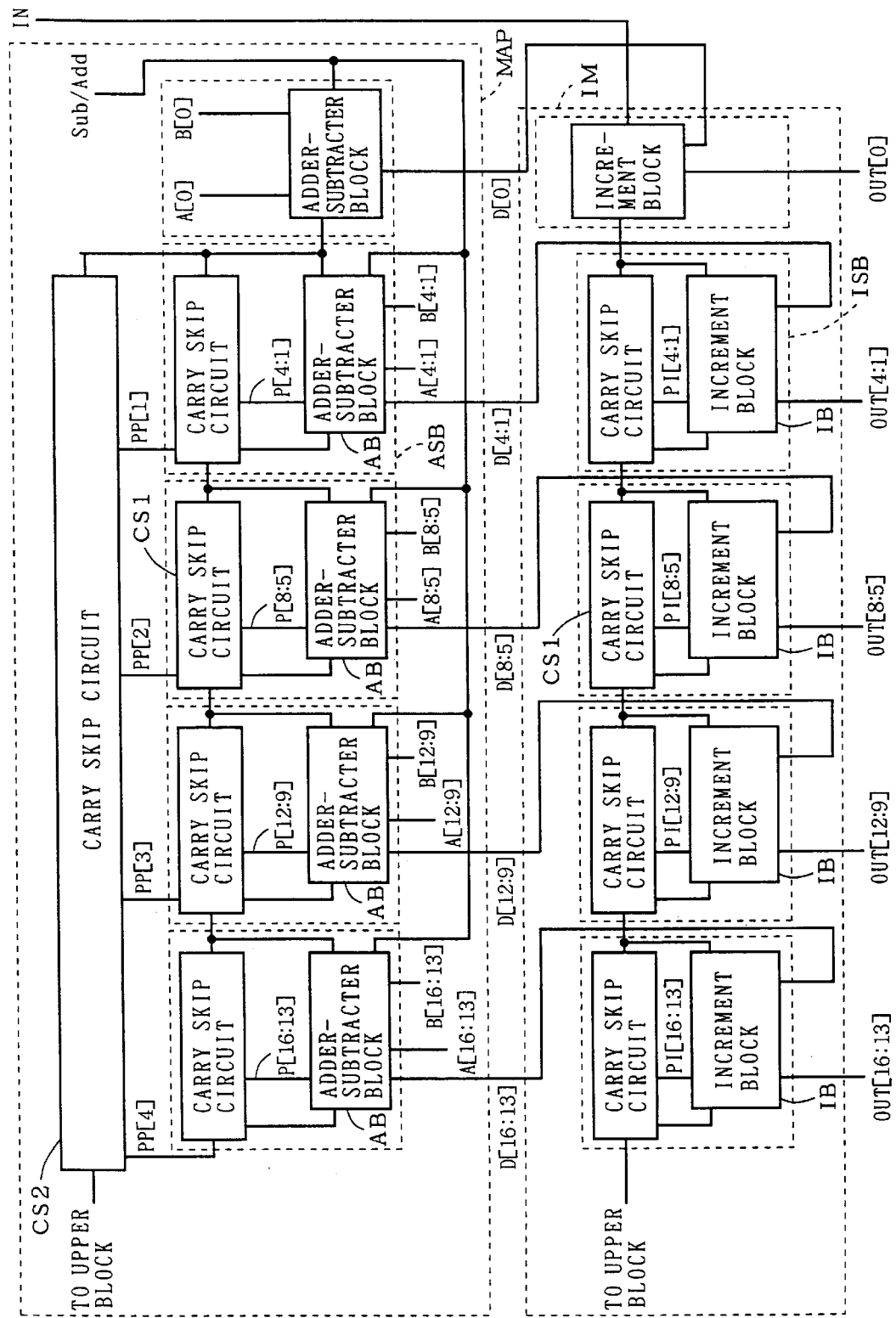
F I G. 7

*FIG. 14*
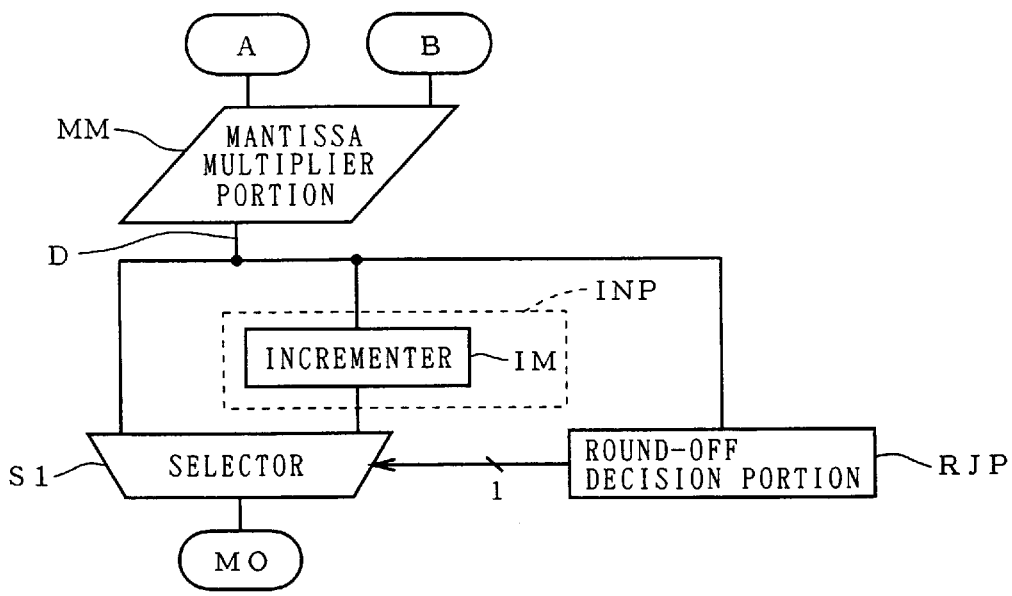
PRIOR ART *FIG. 15*
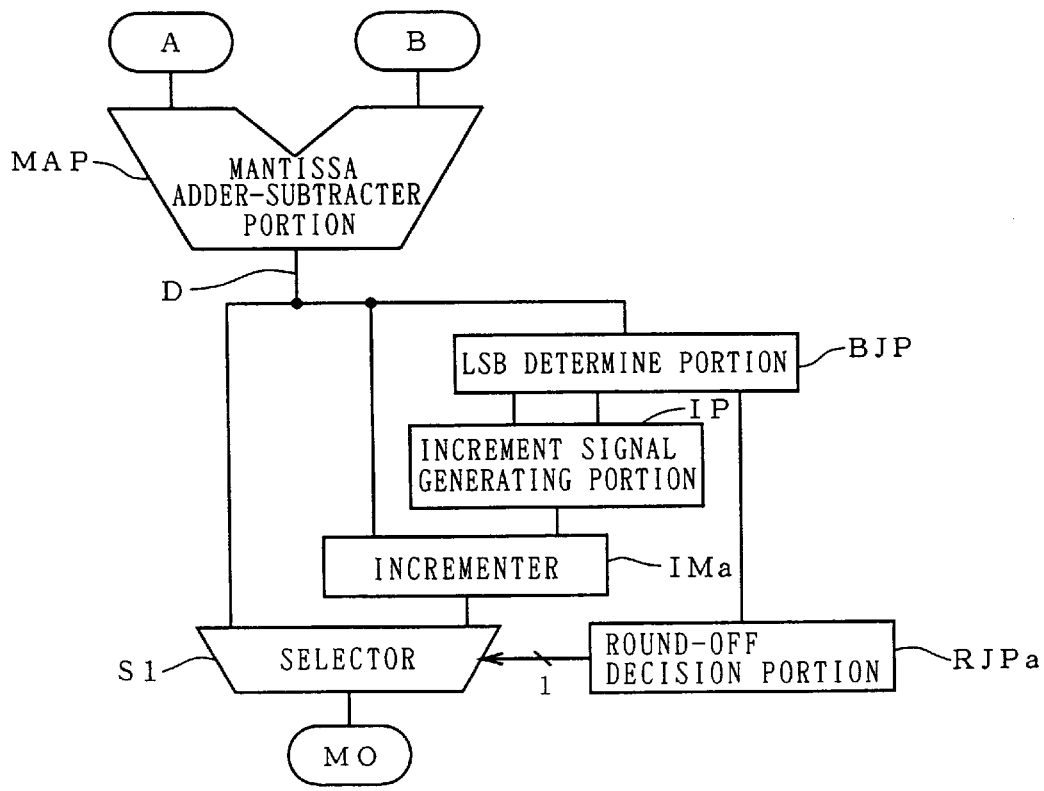

FLOATING-POINT ARITHMETIC UNIT WHICH SPECIFIES A LEAST SIGNIFICANT BIT TO BE INCREMENTED

BACKGROUND OF THE INVENTION

1. Field of the Invention

The present invention relates to a floating-point arithmetic unit for performing arithmetic operations of floating-point data, and particularly to nearest value round-off according to IEEE Std 754 referred to as business standard.

2. Description of the Background Art

IEEE Std 754 is practically a business standard about the floating-point arithmetic operations, whose outstanding characteristics include the following four round-off modes:

(1) Nearest value round-off;

(2) + Infinity round-off;

(3) − Infinity round-off; and (4) Round-down.

When a floating-point arithmetic unit is configured with hardware to perform the above-mentioned round-off modes (1) to (4), the circuit configuration of the floating-point arithmetic unit will be complicated, leading to an increase in throughput.

FIG. 15 shows a part relating to round-off processing in such a floating-point arithmetic unit as is disclosed in Japanese Patent Laying-Open No.6-59858 as an example. The mantissa adder-subtracter portion MAP performs addition or subtraction of mantissa data A and B in two pieces of floating-point data. It is assumed here that the preceding and following processing system is configured so that the result of addition or subtraction is always presented as an absolute value, or a positive value. The ISB determination portion BJP determines whether the high-order three bits in the arithmetic result D made by the mantissa adder-subtracter portion MAP are "0" or not. The increment signal generating portion IP generates an increment signal for indicating a bit to be rounded up (an increment bit position) by using the determination result from the LSB determination portion BJP. The incrementer IMa applies increment to the bit indicated by the increment signal among the bits forming the arithmetic result D. The round-off decision portion RJPa decides whether to round by using the determination result from the LSB determination portion BJP. When the decision result from the round-off decision portion RJPa indicates round-off, the selector S1 selects and outputs the arithmetic result from the incrementer IMa. In other cases, it selects and outputs the arithmetic result D from the mantissa adder-subtracter portion MAP. The character MO indicates the output result from the selector S1.

However, in the arithmetic result made by the mantissa adder-subtracter portion MAP, the values are sequentially determined from the least significant bit side to the most significant bit side by carries occurring in this direction when adding the mantissa data A and B, for example. Accordingly, the increment signal generating portion IP has to wait until all bits in the arithmetic result D have been determined to specify the increment bit position. This waiting time increases the throughput.

SUMMARY OF THE INVENTION

According to a first aspect of the present invention, a floating-point arithmetic unit comprises: an arithmetic operation portion receiving mantissa data in first floating-point data and mantissa data in second floating-point data, for performing arithmetic operation of the data; an increment portion connected to the arithmetic operation portion, receiving the arithmetic result made by the arithmetic operation portion, for applying increment to a bit in the arithmetic result which corresponds to the LSB on the assumption that either no overflow shift of the MSB in the arithmetic result or any cancellation shift of the MSB in the arithmetic result occurs; a round-off decision portion receiving the arithmetic result made by the arithmetic operation portion, for deciding whether to round up a bit in a position one place lower than the LSB on the basis of the arithmetic result; and a first selector receiving the arithmetic result made by the arithmetic operation portion, the arithmetic result made by the increment portion, and the decision result made by the round-off decision portion, for selectively outputting one of the arithmetic result from the increment portion and the arithmetic result from the arithmetic operation portion in accordance with the decision result from the round-off decision portion.

Preferably, according to a second aspect, in the floating-point arithmetic unit, the increment portion comprises an LSB specify portion for determining whether the arithmetic operation is an effective addition or an effective subtraction and specifying the LSB in accordance with the result of the determination.

Preferably, according to a third aspect, in the floating-point arithmetic unit, the LSB specify portion comprises an increment bit determination portion for making the determination, and a second selector receiving the determination result made by the increment bit determination portion, for selectively outputting one of predetermined data for effective addition and predetermined data for effective subtraction in accordance with the determination result made by the increment bit determination portion, and the increment portion further comprises an incrementer receiving the arithmetic result from the arithmetic operation portion and the selected result made by the second selector, for adding these results to perform the increment.

Preferably, according to a fourth aspect, in the floating-point arithmetic unit, the LSB specify portion comprises an increment bit determination portion for making the determination and selectively outputting data for effective addition or data for effective subtraction in accordance with the result of the determination, and the increment portion further comprises an incrementer receiving the arithmetic result made by the arithmetic operation portion and an output from the increment bit determination portion, for adding them to perform the increment.

Preferably, according to a fifth aspect, in the floating-point arithmetic unit, the LSB specify portion comprises an increment bit determination portion for making the determination, and a bit shifter receiving the arithmetic result made by the arithmetic operation portion and the determination result made by the increment bit determination portion, for shifting the arithmetic result made by the arithmetic operation portion in accordance with the determination result made by the increment bit determination portion, and the increment portion further comprises an incrementer receiving the arithmetic result made by the arithmetic operation portion outputted through the bit shifter, for performing the increment.

Preferably, according to a sixth aspect, in the floating-point arithmetic operation unit, the LSB specify portion comprises an increment bit determination portion for making the determination, a first bit shifter receiving the mantissa data in the first floating-point data and the determination result made by the increment bit determination portion, for shifting the mantissa data in the first floating-point data in accordance with the determination result made by the increment bit determination portion and outputting the shifted data to the arithmetic operation portion, and a second bit shifter receiving the mantissa data in the second floating-point data and the determination result made by the increment bit determination portion, for shifting the mantissa data in the second floating-point data in accordance with the determination result made by the increment bit determination portion and outputting the shifted data to the arithmetic operation portion, and wherein the increment portion further comprises an incrementer receiving the arithmetic result made by the arithmetic operation portion, for performing the increment.

Preferably, according to a seventh aspect, in the floating-point arithmetic unit, the data for effective addition selectively outputted from the increment bit determination portion is "1", and the data for effective subtraction selectively outputted from the increment bit determination portion is "0", and the incrementer comprises a full adder receiving the least significant bit in the arithmetic result made by the arithmetic operation portion, the output from the increment bit determination portion, and "1", for generating and outputting the least significant bit in the arithmetic result of the increment portion.

Preferably, according to an eighth aspect, in the floating-point arithmetic unit, the increment portion further comprises an incrementer receiving the arithmetic result made by the arithmetic operation portion, for performing the increment, and the arithmetic operation portion comprises a plurality of arithmetic operation division blocks for dividing the mantissa data in the first floating-point data and the mantissa data in the second floating-point data arranged in parallel to each other in order from the least significant bit side to the most significant bit side into a plurality of bit groups, and respectively processing the plurality of bit groups, and the incrementer comprises a plurality of increment division blocks for respectively processing arithmetic results made by the plurality of arithmetic operation division blocks.

According to the first aspect, in any event, the incrementer increments the bit which corresponds to the ILSB on the assumption that either no overflow shift of the MSB in the arithmetic result made by the arithmetic operation portion or any cancellation shift of the MSB in the arithmetic result occurs, which improves the throughput about round-off processing.

According to the second aspect, the LSB can be specified on the basis of the determination as to whether the arithmetic operation is effective addition or effective subtraction.

According to the third aspect, the increment can be realized by adding the determination result, including the data for effective addition or the data for effective subtraction, made by the increment bit determination portion, and the arithmetic result made by the arithmetic operation portion.

According to the fourth aspect, the structure can be simplified as compared with that of the third aspect.

According to the fifth aspect, the bit shifter shifts the LSB in the arithmetic result made by the arithmetic operation portion before the arithmetic result is inputted to the incrementer. This enables application of a known incrementer.

According to the sixth aspect, the bit shifters shift the LSBs in the mantissa data before the mantissa data are inputted to the arithmetic operation portion. This enables application of a known incrementer.

According to the seventh aspect, the full adder is located in the endmost position in the incrementer, for example. This allows regular structure of the incrementer to facilitate the circuit design.

According to the eighth aspect, it is possible to almost simultaneously finish the arithmetic processing by the arithmetic operation portion and the operation by the incrementer to further improve the throughput.

The present invention has been made to solve the problem mentioned above. An object of the present invention is to obtain a floating-point arithmetic unit with improved throughput about round-off processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing an example of a mantissa adder-subtracter portion and the incrementer in the first preferred embodiment of the present invention.

FIG. 14 is a block diagram showing an example of a floating-point arithmetic unit according to a fifth preferred embodiment of the present invention.

FIG. 15 is a block diagram showing a conventional floating-point arithmetic unit.

DESCRIPTION OF THE PREFERRED EMBODIMENTS

First Preferred Embodiment

Figure 16:
FIG. 16 is a diagram showing a format of floating-point data.

Now suppose that floating-point data is represented by the format shown in FIG. 16. Specifically, when +1.1111010^1101 and +1.1011^1001 are added and undergo nearest value round-off, then +1.0000100^1110 is obtained.

Figure 17:
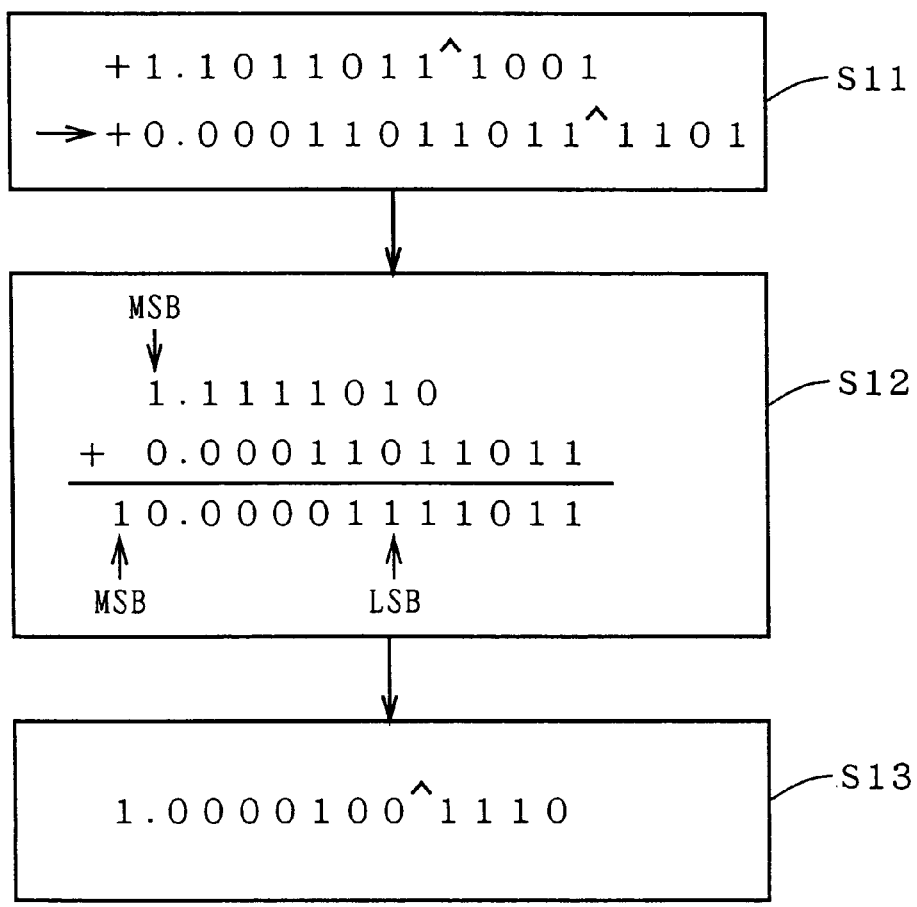
FIG. 17 is a flowchart for illustrating the procedure for computing floating-point data.

FIG. 17 shows the procedure in which the value +1.0000100^1110 is obtained. First, +1.1111010^1101 and +1.1011^1001 are aligned (decimal tabulation). Here, +1.0000100^1110 is changed into +0.00011011011^1101 (Step S11).

Next, the mantissa data 1.1111010 and 0.00011011011 are added together. This results in 10.00001111011 (Step S12). As shown in Step S12, the MSB in the mantissa data is shifted by a carry from the position one place higher than the decimal point to the two place higher position. When the MSB shifts to a higher position, it is referred to as an overflow shift. Here, the mantissa data has eight bits and therefore the eighth bit from the MSB corresponds to the LSB of the mantissa data.

Since the digit one place lower than the LSB is "1," the bit one place lower than the LSB is rounded up. Then it is normalized to obtain the above-mentioned value +1.0000100^1110 (Step S13).

The above-described specific example corresponds to a case of an effective addition with an overflow shift and round-up. Other cases include those shown in Table 1. The effective addition means addition of mantissa data with the same signs or subtraction of mantissa data with different signs. Effective subtraction means addition of mantissa data with different signs or subtraction of mantissa data with the same signs. Cancellation shift is the opposite of the overflow shift. It means shift of MSB to a lower position. In the Table, the bits in squares are LSBs.

Figure 18:
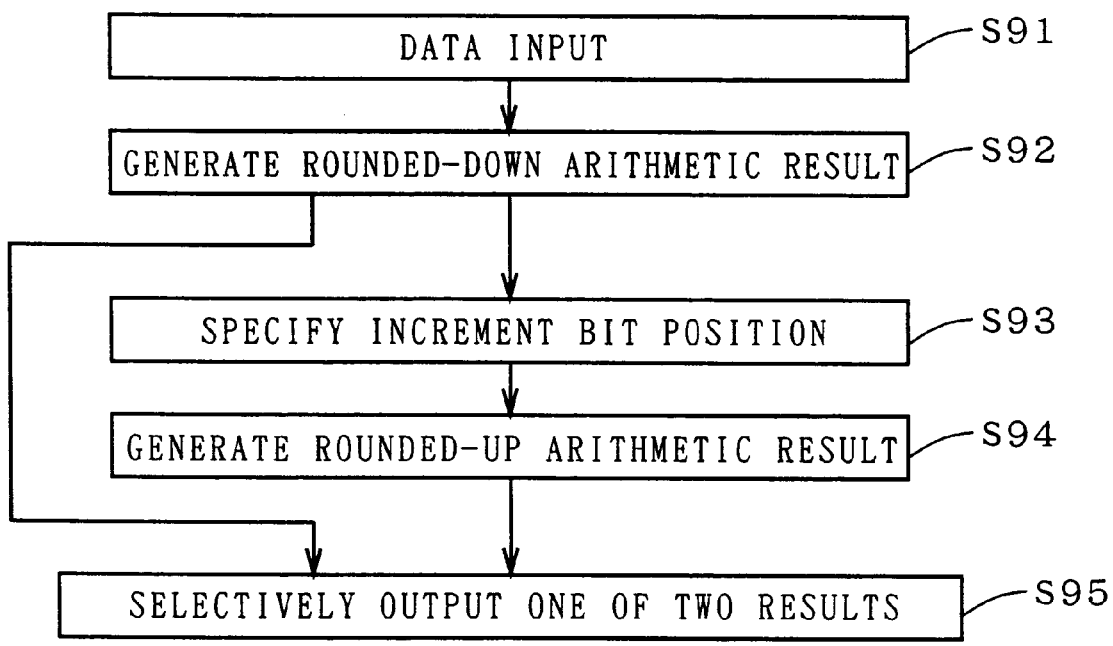
FIG. 18 is a flowchart showing the operational concept of the conventional floating-point arithmetic unit.

Conventionally, as summarized in FIG. 18, floating-point data are inputted (Step S91) and then the mantissa adder-subtracter portion MAP performs addition/subtraction of mantissa data A and B in the floating-point data (Step S92). The result of the arithmetic operation by the mantissa adder-subtracter portion MAP results in one with round-down. Next, the increment bit position is specified (Step S93) and the incrementer IMa generates an arithmetic result with round-up (Step S94), and finally, one of the rounded-down arithmetic result and the rounded-up arithmetic result is outputted selectively (Step S95). As for the increment bit position, in Japanese Patent Laying-Open No.6-59858, referring to Table 1, D[9], D[8], D[7] are checked and then one of D[2], D[1], D[0] is specified as the increment bit position.

Figure 1:
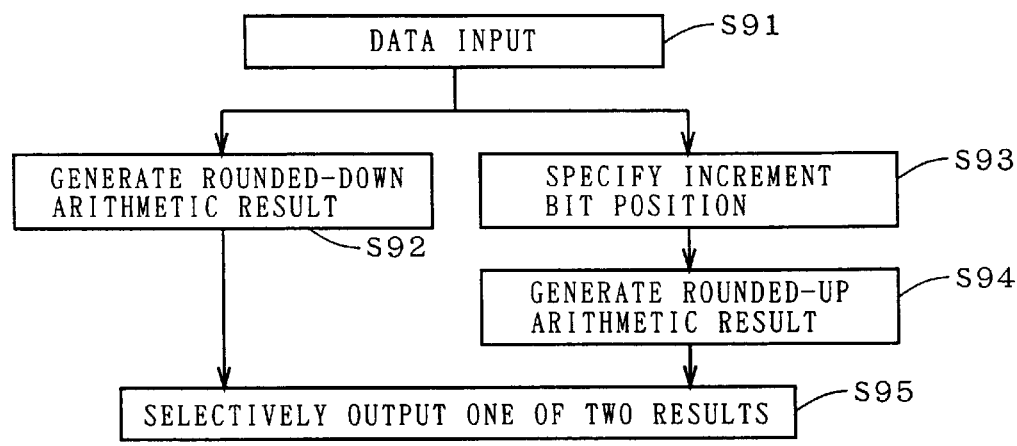
FIG. 1 is a flowchart showing the operational concept of a floating-point arithmetic unit according to a first preferred embodiment of the present invention.

In the first preferred embodiment, as shown in FIG. 1, Step S92 and Step S93 are performed at the same time. Steps S92 and S93 can be performed at the same time for the following reason. First, in the first preferred embodiment, D[1] is specified as the increment bit position in the case of effective addition, and D[0] is specified in the case of effective subtraction. Only the two bit positions D[1] and D[0] are considered for the increment bit position because of the following reason. In the case of round-up with an overflow shift and the case of round-up without an overflow shift, incrementing D[1] will provide correct results in either case. In the case of round-up with a cancellation shift and the case of round-up without a cancellation shift, incrementing D[0] will provide correct results in either case.

Accordingly, for effective addition, it is assumed that no overflow shift will occur and D[1] is specified as the LSB, or the increment bit position. For effective subtraction, it is assumed that cancellation shift will occur and D[0] is specified as the LSB, or the increment bit position. Whether the arithmetic operation is effective addition or effective subtraction can be determined with an instruction signal given to the mantissa adder-subtracter portion MAP to indicate whether to perform addition or subtraction and the signs of the floating-point data. Accordingly it can be known prior to Step S92. This enables Steps S92 and S93 to be

TABLE 1

| arithmetic type | case | | data before round-off | mantissa data after round-off | dropped part before round-off |
|---|---|---|---|---|---|
| effective addition | overflow shift | round-up | 1 0 0 0 0 0 1 [1] 1 1 0 1 1 | 1 0 0 0 0 1 0 0 | 1 1 0 1 1 |
| | | round-down | 1 0 0 0 0 0 1 [1] 0 1 0 1 1 | 1 0 0 0 0 0 1 1 | 0 1 0 1 1 |
| | no overflow shift | round-up | 0 1 0 0 0 0 1 1 [1] 1 0 1 1 | 1 0 0 0 1 0 0 0 | 1 0 1 1 |
| | | round-down | 0 1 0 0 0 0 1 1 [1] 0 0 1 1 | 1 0 0 0 0 1 1 1 | 0 0 1 1 |
| effective subtraction | no cancellation shift | round-up | 0 1 1 0 0 1 1 0 [0] 1 0 1 1 | 1 1 0 0 1 1 0 1 | 1 0 1 1 |
| | | round-down | 0 1 1 0 0 1 1 0 [0] 0 1 1 1 | 1 1 0 0 1 1 0 0 | 0 1 1 1 |
| | cancellation shift | round-up | 0 0 1 1 1 1 1 0 0 [1] 1 1 1 | 1 1 1 1 1 0 1 0 | 1 1 1 |
| | | round-down | 0 0 1 1 1 1 1 0 0 [1] 0 1 1 | 1 1 1 1 1 0 0 1 | 0 1 1 |

D[9], D[8], D[7] — D[2], D[1], D[0], D[-1]

Although not shown in Table 1, MSB may be shifted to a lower position for two or more bits in cancellation shift. In this case, since the bits in the positions lower than the LSB are all zeros and always dropped, it can always be treated as round-down. Hence it is not described in detail.

achieved at the same time. Now a floating-point arithmetic unit which realizes the processing in FIG. 1 will be described.

Figure 2:
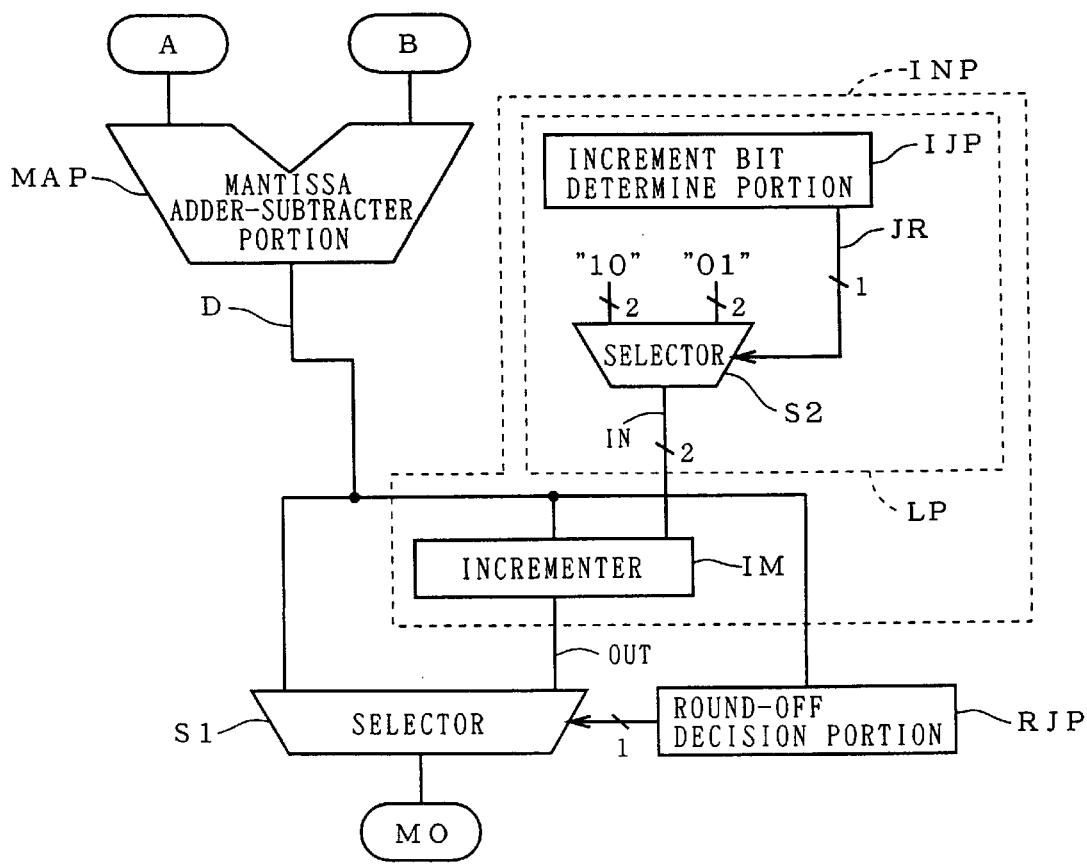
FIG. 2 is a block diagram showing an example of the floating-point arithmetic unit according to the first preferred embodiment of the present invention.

FIG. 2 is a block diagram showing the structure of a floating-point arithmetic unit according to a first preferred embodiment of the present invention. In FIG. 2, A and B show mantissa data in first and second floating-point data which have already been aligned, MAP shows a mantissa adder-subtracter portion (arithmetic operation) receiving the mantissa data A and the mantissa data B, for performing arithmetic operation of the data (here, effective addition or effective subtraction), INP shows an increment portion receiving the arithmetic result D made by the mantissa adder-subtracter portion MAP, RJP shows a round-off decision portion receiving arithmetic result D, for deciding whether to round up the bit in the position one place lower than the LSB on the basis of the arithmetic result D, S1 shows a first selector receiving the arithmetic result D made by the mantissa adder-subtracter portion MAP, the arithmetic result made by the increment portion INP, and the decision result made by the round-off decision portion RJP, for selectively outputting the arithmetic result from the increment portion INP when the decision result from the round-off decision portion RJP indicates round-up and selecting and outputting the arithmetic result D from the mantissa adder-subtracter portion MAP in other cases, and MO shows the output result from the selector S1.

In the first preferred embodiment, the increment portion INP includes an LSB specify portion LP and an incrementer IM. The LSB specify portion LP determines whether the arithmetic operation performed by the mantissa adder-subtracter portion MAP is effective addition or effective subtraction. When the arithmetic operation by the mantissa adder-subtracter portion MAP is effective addition, it specifies D[1] as the LSB on the assumption that no overflow shift occurs, and when the arithmetic operation by the mantissa adder-subtracter portion MAP is effective subtraction, it specifies D[0] as the LSB on the assumption that cancellation shift occurs. The incrementer IM performs incrementing to the arithmetic result D.

The LSB specify portion LP includes an increment bit determination portion IJP and a selector S2. The increment bit determination portion IJP determines whether the arithmetic operation performed by the mantissa adder-subtracter portion MAP is effective addition or effective subtraction.

The selector S2 receives the determination result made by the increment bit determination portion IJP. When the determination result from the increment bit determination portion IJP indicates effective addition, the selector S2 selects and outputs "10." When the determination result from the increment bit determination portion IJP indicates effective subtraction, the selector S2 selects and outputs "01." The incrementer IM receives the arithmetic result D from the mantissa adder-subtracter portion MAP and the selected result made by the selector S2.

In this way, the LSB specify portion LP knows whether the arithmetic operation is effective addition or effective subtraction before the mantissa adder-subtracter portion MAP performs the arithmetic operation. In the case of effective addition, it assumes that no overflow shift occurs and specifies D[1] as the increment bit position. In the case of effective subtraction, it assumes that cancellation shift occurs and specifies D[0] as the increment bit position.

Figure 3:
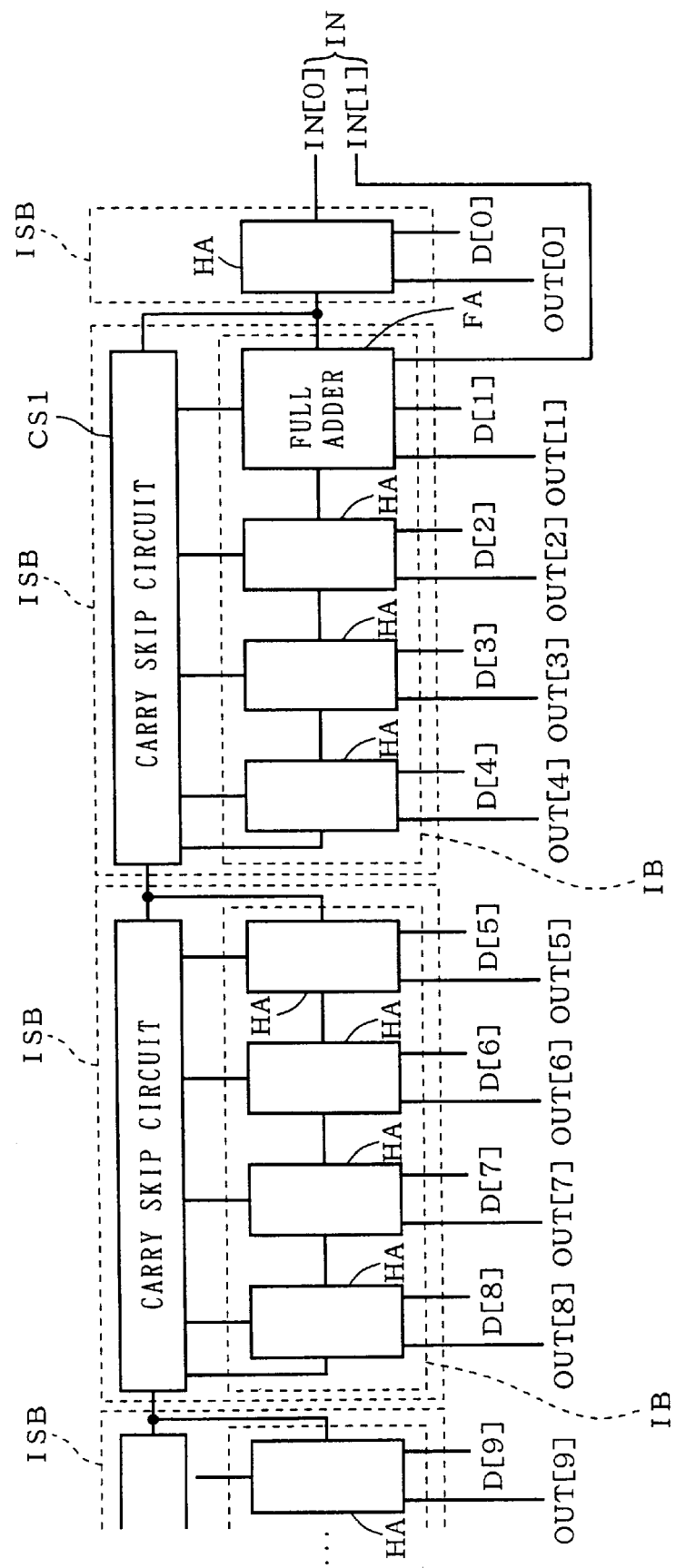
FIG. 3 is a block diagram showing an example of the internal structure of an incrementer in the first preferred embodiment of the present invention.

The incrementer IM will be described in greater detail. In the first preferred embodiment, the incrementer IM desirably has the internal structure shown in FIG. 3. D[i] (i=0, 1, 2, . . . ) show the bits configuring the arithmetic result D made by the mantissa adder-subtracter portion MAP, where D[0] is the least significant bit. In FIG. 3, D[i] are shown in order from the least significant bit side to the most significant bit side.

IN[0] and IN[1] are the bits forming the selected result IN from the selector S2. When the selected result from the selector S2 is "10", IN[1] and IN[0] are "1" and "0", respectively, and when the selected result from the selector S2 is "01", then IN[1] and IN[0] are "0" and "1", respectively.

OUT[i] (i=0, 1, 2, . . . ) show the bits forming the arithmetic result obtained by the incrementer IM. The character i is 26 in the case of the IEEE Std 754 single precision format, and it is 55 in the case of the double precision format.

Figure 4:
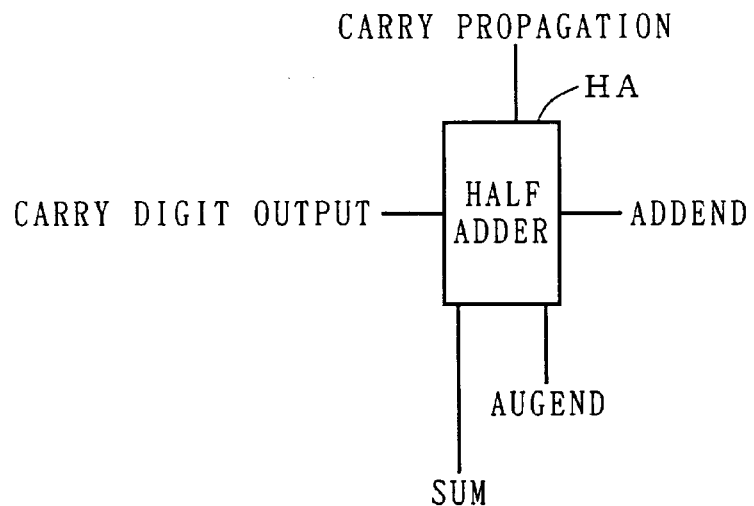
FIG. 4 is a diagram showing a half adder in the first preferred embodiment of the present invention.
Figure 5:
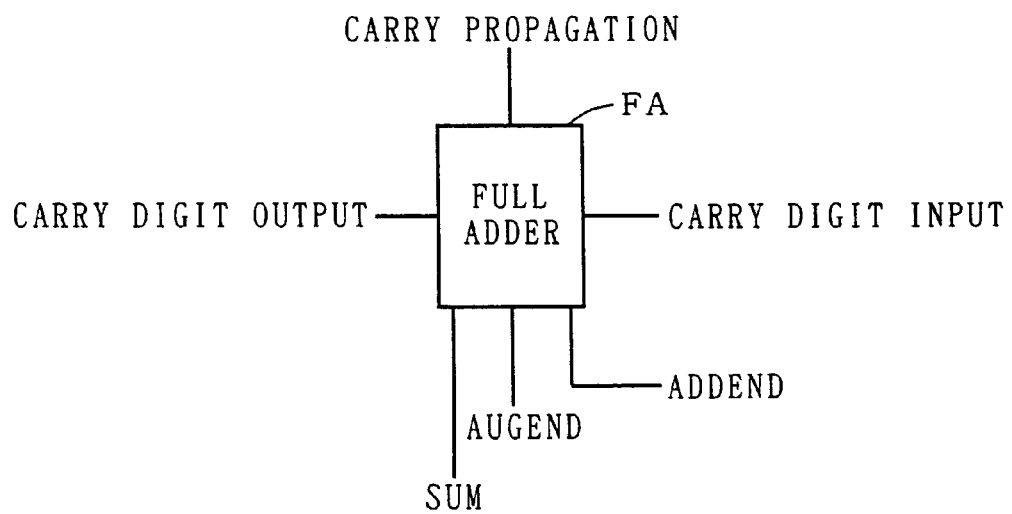
FIG. 5 is a diagram showing a full adder in the first preferred embodiment of the present invention.

The reference character HA denotes a known half adder and FA denotes a known full adder. The half adders HA and the full adder FA shown in FIG. 3 are correspondingly shown in FIG. 4 and FIG. 5, respectively. The carry propagation shown in FIG. 4 and FIG. 5 is an exclusive OR of the addend and augend for the full adder FA, and it is the augend for the half adder HA.

The structure shown in FIG. 3 includes a row of a plurality of adders which receive respective D[i] and output respective OUT[i], where D[1] is received at the full adder FA and others are received at the half adders HA. The arithmetic result D is divided into a plurality of bit groups, as D[0], D[1] to D[4], D[5] to D[8], . . . . For example, the bit group including D[5] to D[8] is represented as D[8:5]. The incrementer IM includes a plurality of increment division blocks ISB for processing corresponding bit groups in the arithmetic result D, each increment division block ISB including four adders connected in series. Note that the increment division block ISB for processing D[0] includes one adder. The plurality of increment division blocks ISB are connected in series, where the increment division blocks ISB receive carry digits from the preceding increment division blocks ISB, respectively. Each plurality of adders included in the corresponding increment division block ISB are referred to as an increment block IB. The full adder FA receives IN[1] as its addend and the half adder HA for receiving D[0] receives IN[0] as its addend.

The operation of the incrementer IM will now be described. For example, the increment division block ISB receiving the bit group D[8:5] adds the carry digit from the preceding increment division block ISB to the bit group D[8:5]. Accordingly, as a whole, the incrementer IM adds IN[0] to the arithmetic result D. Further, IN[0] is added to D[0] and IN[1] is added to D[1]. Thus, when the arithmetic operation performed by the mantissa adder-subtracter portion MAP is effective subtraction, IN[0] is "1", and then D[0] is incremented. When the arithmetic operation by the mantissa adder-subtracter portion MAP is effective addition, IN[1] is "1" and hence D[1] is incremented.

In this way, the incrementer IM adds the arithmetic result D from the mantissa adder-subtracter portion MAP and the selected result IN from the selector S2 to increment the increment bit position specified by the LSB specify portion LP.

Figure 6:
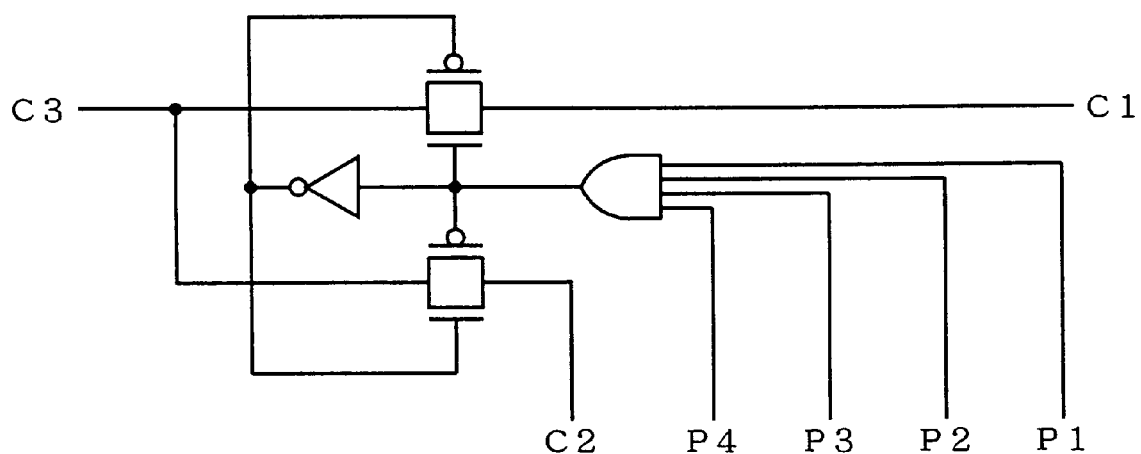
FIG. 6 is a block diagram showing an example of the internal structure of a carry skip circuit in the first preferred embodiment of the present invention.

A carry skip circuit CS1 is included in each increment division block ISB including an increment block IB, which speeds up the operation of the incrementer IM. FIG. 6 shows an example of the internal structure of the carry skip circuit CS1. In FIG. 6, C1 denotes a carry digit from the increment division block ISB in the preceding stage, C2 denotes a carry digit outputted from the increment block IB, P1 to P4 denote carry propagation outputted from the increment block IB, and C3 denotes a carry digit outputted to the increment division block ISB in the following stage. For example, when the bit group D[8:5] includes all ones and a carry digit "1" is received from the preceding increment division block ISB, both of the carry skip circuit CS1 and the increment block IB output a carry digit "1." However, the carry skip circuit CS1 outputs the carry digit "1" quicker than the increment block IB. This increases the operating speed of the incrementer IM.

The method in which carry propagation is thus transferred in block units is called a carry skip method. Applying the carry skip method to a circuit configuration in which carry digit is propagated from lower to higher position as the incrementer IM is effective to improve the operating speed.

Next, the mantissa adder-subtracter portion MAP will be described in greater detail. FIG. 7 shows desirable structure of the mantissa adder-subtracter portion MAP and the incrementer IM. The carry skip method is applied to the structure shown in FIG. 7. In the first preferred embodiment, the internal structure of the mantissa adder-subtracter portion MAP can be represented as identical to that of the incrementer IM, when it is represented in a block diagram. A[0], A[4:1], A[8:5], . . . are bit groups which form the mantissa data A, and B[0], B[4:1], B[8:5], . . . are bit groups which form the mantissa data B. In FIG. 7, the mantissa data A and the mantissa data B are drawn in parallel from the least significant bit side to the most significant bit side in order. PP[1], PP[2], . . . denote carry propagation of the carry skip circuits CS1, and PI[4:1], PI[8:5], . . . are carry propagation of the increment blocks IB.

Sub/Add is an instruction signal indicating whether to perform addition or subtraction.

Figure 8:
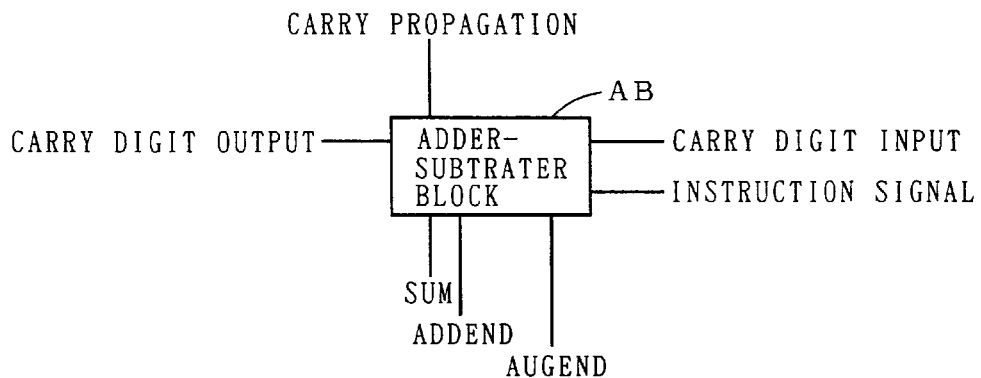
FIG. 8 is a diagram showing an adder-subtracter block in the first preferred embodiment of the present invention.

The mantissa adder-subtracter portion MAP includes a plurality of arithmetic operation division blocks ASB for processing corresponding bit groups in the mantissa data A and the mantissa data B. Each arithmetic operation division block ASB includes an adder-subtracter block AB receiving the bit groups in the mantissa data A and the mantissa data B, for performing subtraction or addition of the bit group in the mantissa data A and the bit group in the mantissa data B in accordance with the instruction signal Sub/Add. The adder-subtracter blocks AB shown in FIG. 7 are illustrated in correspondence in FIG. 8. The plurality of arithmetic operation division blocks ASB are connected in series, where the arithmetic operation division blocks ASB receive carry digits from the arithmetic operation division blocks ASB in the preceding stages.

Here, the operation of the mantissa adder-subtracter portion MAP will be described for operation of addition. For example, the arithmetic operation division block ASB receiving the bit groups A[8:5] and B[8:5] adds the bit group A[8:5] to the bit group B[8:5], and further, adds the carry digit from the preceding arithmetic operation division block ASB. Accordingly the entirety of the mantissa adder-subtracter portion MAP adds the mantissa data B to the mantissa data A.

Each arithmetic operation division block ASB, except that for processing A[0] and B[0], includes a carry skip circuit CS1 to increase the operating speed of the mantissa adder-subtracter portion MAP. The mantissa adder-subtracter portion MAP also includes a carry skip circuit CS2 for each four of the arithmetic operation division blocks ASB to further increase the operating speed.

For example, in the mantissa adder-subtracter portion MAP, suppose that a carry digit is propagated from the arithmetic operation division block ASB for processing the bit group A[4:1] to the arithmetic operation division block ASB for processing the bit group A[12:9] through the carry skip circuit CS1 in the arithmetic operation division block ASB for processing the bit group A[8:5]. The arithmetic operation division block ASB for processing the bit group A[4:1] outputs the bit group D[4:1] to the increment block ISB and the arithmetic operation division block ASB for processing the bit group A[12:9] outputs the bit group D[12:9] to the increment block ISB. Subsequently, a carry digit is propagated from the increment division block ISB for processing the bit group D[4:1] to the increment division block ISB for processing the bit group D[12:9] through the carry skip circuit CS1 in the increment division block ISB for processing the bit group D[8:5]. In this way, it is possible to almost simultaneously finish the processing in the mantissa adder-subtracter portion MAP and the processing in the incrementer IM.

As described above, it is preferred that the mantissa adder-subtracter portion MAP and the incrementer IM have matched block structures. Then the operating speed can be more effectively improved by applying the carry skip method to both of the mantissa adder-subtracter portion MAP and the incrementer IM.

Next, the round-off decision portion RJP can decide whether to round up the bit in the position one place lower than the LSB in the following way, for example. Table 2 shows cases of round-up and round-down.

TABLE 2

| Case | LSB | Dropped part |
|---|---|---|
| Round-up | 1/0 | 1 1 1 1 1 1 1 1 |
|  |  | 1 1 1 1 1 1 1 0 |
|  |  | . |
|  |  | . |
|  |  | . |
|  |  | 1 0 0 0 0 0 1 0 |
|  |  | 1 0 0 0 0 0 0 1 |
|  | 1 | 1 0 0 0 0 0 0 0 |
| Round-down | 0 | 1 0 0 0 0 0 0 0 |
|  | 1/0 | 0 1 1 1 1 1 1 1 |
|  |  | 0 1 1 1 1 1 1 0 |
|  |  | . |
|  |  | . |
|  |  | . |
|  |  | 0 0 0 0 0 0 0 1 |
|  |  | 0 0 0 0 0 0 0 0 |

As shown in Table 2, when the round-up occurs in the nearest value round-off, the most significant bit in the dropped part is "1" regardless of the LSB, and when the round-down occurs, the most significant bit in the dropped part is "0" regardless of the LSB, or the LSB is "0" and the most significant bit in the dropped part is "1" with all of the remaining bits in the dropped part being "0".

Table 3 shows patterns in the cases of overflow shift, cancellation shift, and no shift, for the bit number in Table 1.

TABLE 3

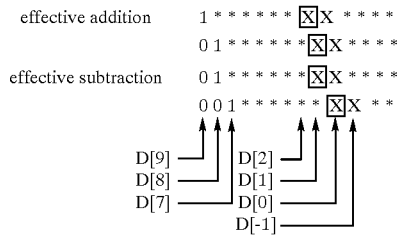

From Table 2 and Table 3, the round-up cases should include the cases where D[9] and D[1] are both "1", D[9] is "0" and D[8] and D[0] are both "1", and both of D[9] and D[8] are "0" and D[−1] is "0".

In this way, it is possible to determine whether to round-up the bit in the position one bit lower than the LSB by using the arithmetic result D made by the mantissa adder-subtracter portion MAP.

According to the first preferred embodiment, unlike the conventional method in which the increment bit position is specified by using the arithmetic result D made by the mantissa adder-subtracter portion MAP, the increment portion INP applies incrementation to the bit which corresponds to the LSB on the assumption that either no overflow shift of the MSB in the arithmetic result D made by the mantissa adder-subtracter portion MAP or any cancellation shift of the MSB in the arithmetic result D occurs, which improves the throughput in the round-off processing.

The IEEE standard was originally defined as a general-purpose standard including numerical operations requiring precise calculations. However, at present, with the growing use of three-dimensional graphics and the like, it is sufficient, in many applications, that the round-off mode include only the nearest value round-off defined as default. Accordingly it is particularly effective for specific applications like the three-dimensional graphics.

Second Preferred Embodiment

Figure 9:
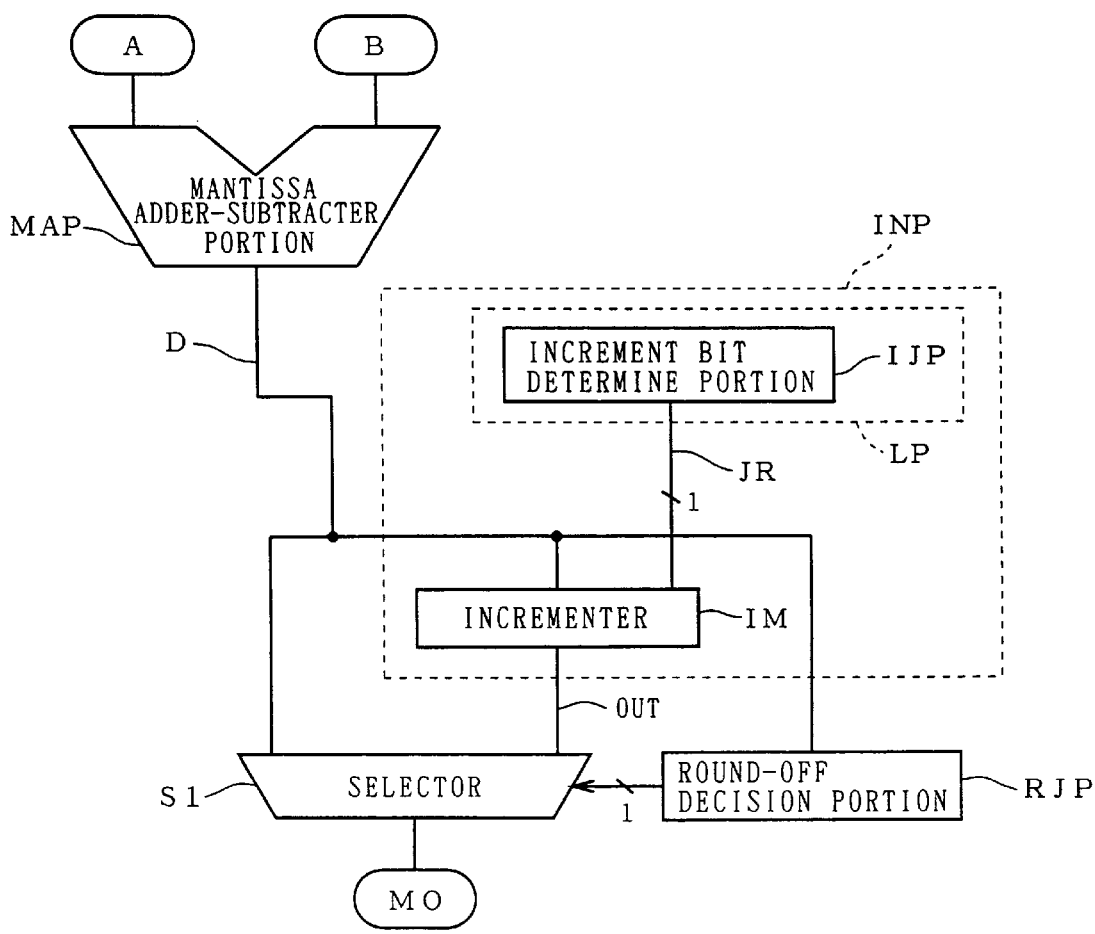
FIG. 9 is a block diagram showing an example of a floating-point arithmetic unit according to a second preferred embodiment of the present invention.

FIG. 9 is a block diagram showing the structure of a floating-point arithmetic unit according to a second preferred embodiment of the present invention. The structure shown in FIG. 9 is obtained by omitting the selector S2 from the structure shown in FIG. 2.

In the second preferred embodiment, when the arithmetic operation made by the mantissa adder-subtracter portion MAP is determined to be effective addition, the increment bit determination portion IJP outputs a determination result JR at "1" as data for effective addition. When the arithmetic operation by the mantissa adder-subtracter portion MAP is determined to be effective subtraction, the increment bit determination portion IJP outputs a determination result JR at "0" as data for effective subtraction.

Figure 10:
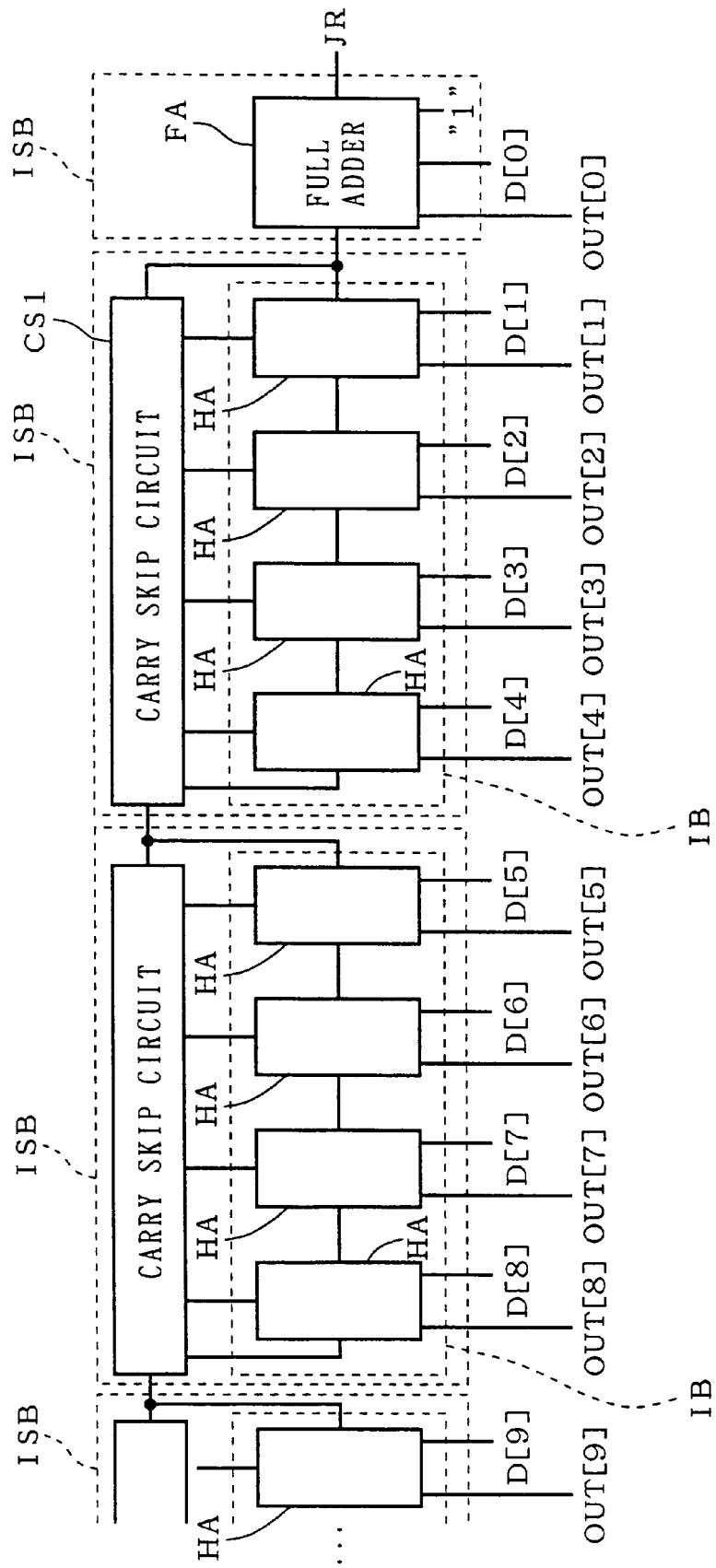
FIG. 10 is a block diagram showing an example of the internal structure of an incrementer in the second preferred embodiment of the present invention.

In the second preferred embodiment, the incrementer IM desirably has the internal structure shown in FIG. 10. The adders for processing D[0] and D[1] are a full adder FA and a half adder HA, respectively. The addend for the full adder FA is "1" and its carry digit input is the determination result JR. The structure is the same as that shown in FIG. 3 in other respects.

The carry digit input to the full adder FA may be "1," with the determination result JP provided as the addend.

In FIG. 10, when the arithmetic operation made by the mantissa adder-subtracter portion MAP is effective addition, the half adder HA for processing D[1] receives the carry digit input at "1", and when it is effective subtraction, the full adder FA for processing D[0] adds "1" to D[0]. In FIG. 3, when the arithmetic operation by the mantissa adder-subtracter portion MAP is effective addition, the full adder FA for processing D[1] receives an addend at "1", and when it is effective subtraction, the half adder HA for processing D[0] adds "1" to D[0]. In this way, the incrementer IM shown in FIG. 10 equivalently perform the same operation as the incrementer IM shown in FIG. 3.

According to the second preferred embodiment, the structure of the LSB specify portion LP is simpler as compared with that shown in FIG. 2. Further, for example, while the full adder FA is located in the middle in the incrementer IM in FIG. 3, it is located in the endmost position in the incrementer IM in FIG. 10. This regular structure of the incrementer IM of FIG. 10 facilitates circuit design.

Third Preferred Embodiment

Figure 11:
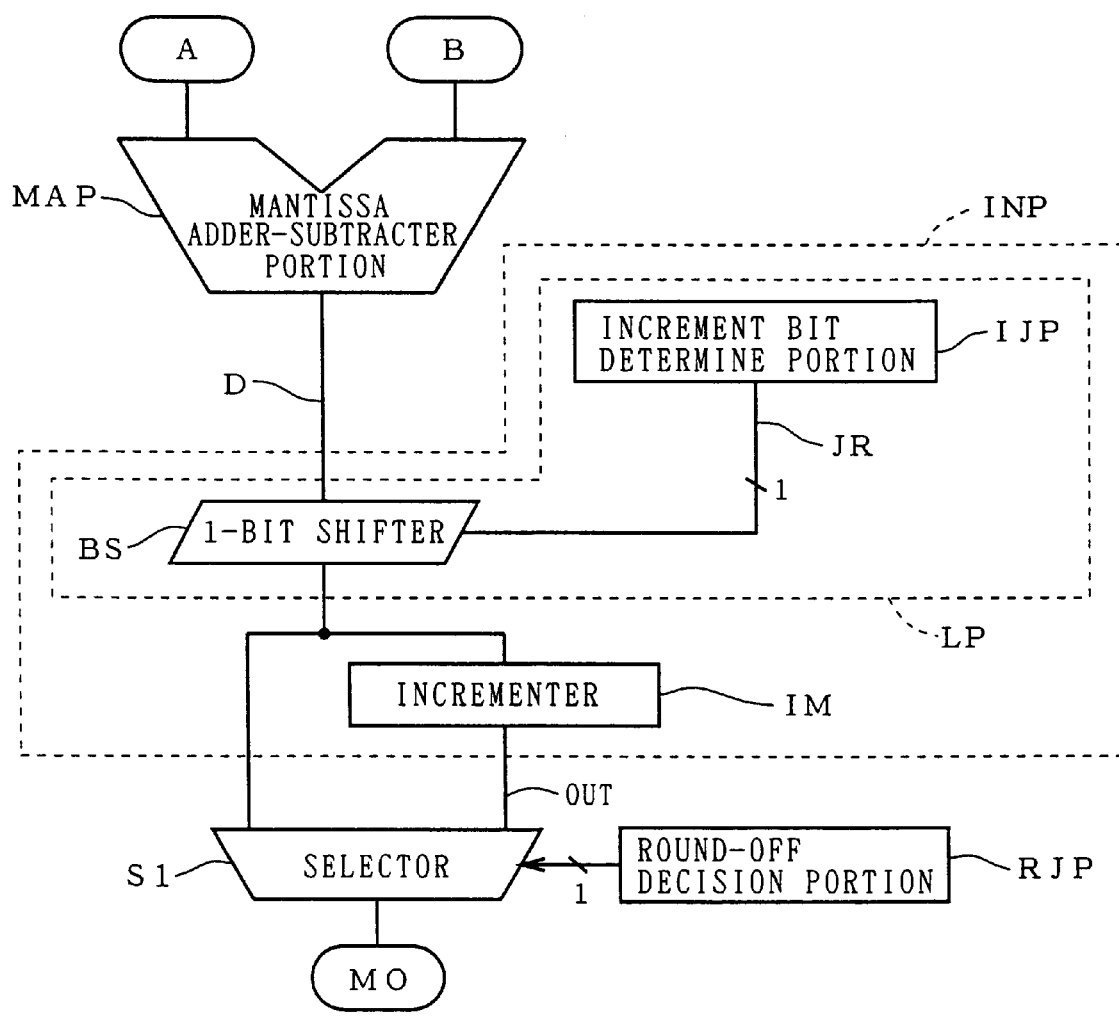
FIG. 11 is a block diagram showing an example of a floating-point arithmetic unit according to a third preferred embodiment of the present invention.

FIG. 11 is a block diagram showing the structure of a floating-point arithmetic unit according to a third preferred embodiment of the present invention. In FIG. 11, BS denotes a one-bit shifter. The one-bit shifter BS receives the arithmetic result D from the mantissa adder-subtracter portion MAP and the determination result JR from the increment bit determination portion IJP. When the determination result JR from the increment bit determination portion IJP indicates effective addition, the one-bit shifter BS shifts the arithmetic result D by one bit and outputs it to the incrementer IM and the selector S1. It otherwise outputs it unchanged to the incrementer IM and the selector S1 without shifting. The other reference characters are the same as those described above.

Figure 12:
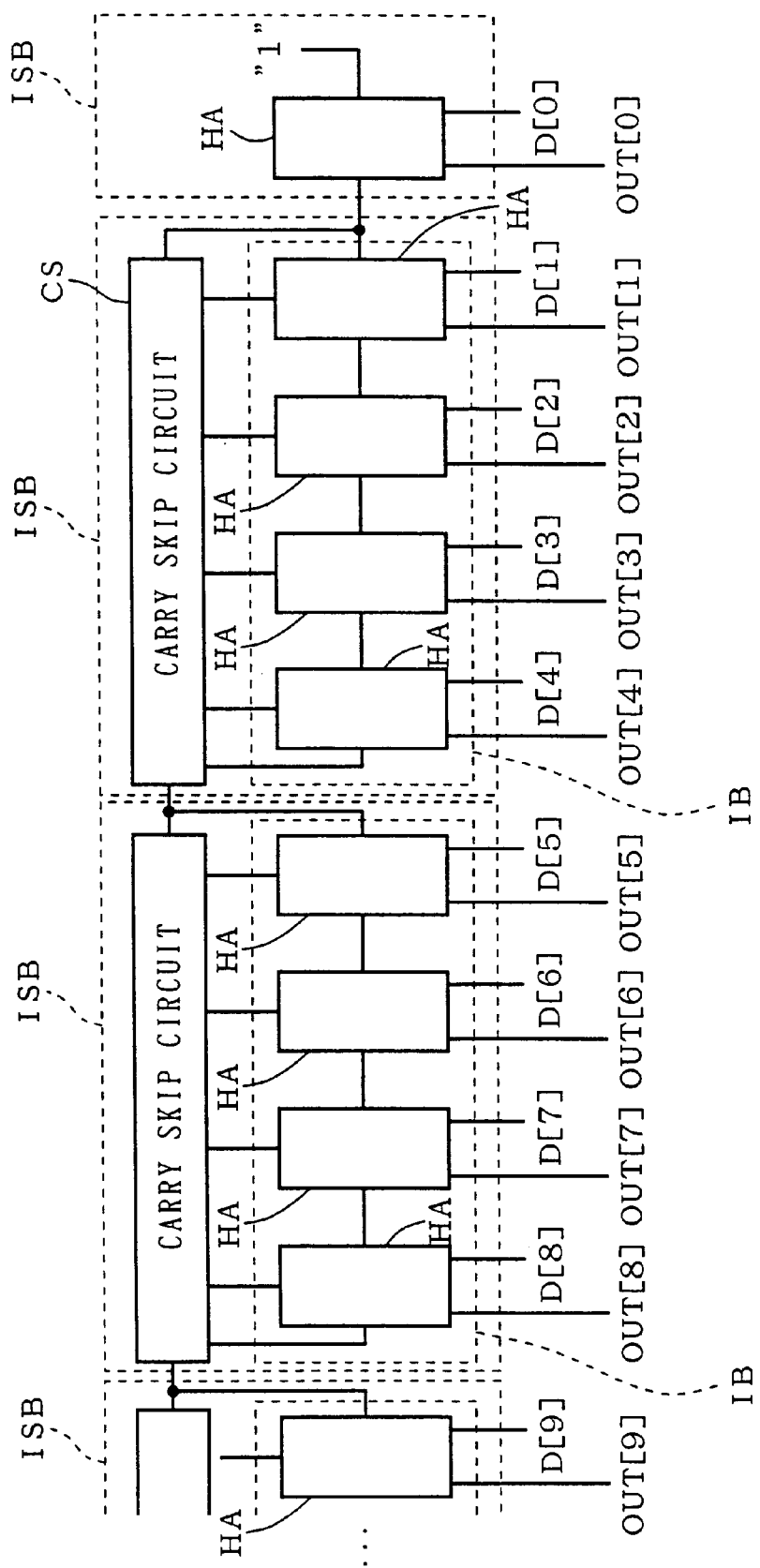
FIG. 12 is a block diagram showing an example of the internal structure of an incrementer in the third preferred embodiment of the present invention.

In the third preferred embodiment, the incrementer IM has the internal structure shown in FIG. 12. In the incrementer IM, the increment bit position is always at the least significant bit D[0], that is, it is a known incrementer.

When the determination result JR made by the increment bit determination portion IJP indicates effective addition, the one-bit shifter BS shifts the arithmetic result D by one bit from the most significant bit side to the least significant bit side and the incrementer IM increments D[0], and 1 is added to the exponent part data by a means not shown. Or, the one-bit shifter BS may shift the arithmetic result D from the least significant bit side to the most significant bit side by one bit when the determination result JR made by the increment bit determination portion IJP indicates effective subtraction, and then the incrementer IM increments D[0] and 1 is subtracted from the exponent part data by a means not shown. As a result, the arithmetic results obtained by the arithmetic operations of two pieces of floating-point data are substantially the same as those in the first preferred embodiment.

According to the third preferred embodiment, it is possible to apply a known incrementer. For example, in IC design, it is possible to use standard general-purpose circuit parts (building blocks) prepared for incrementers.

Fourth Preferred Embodiment

Figure 13:
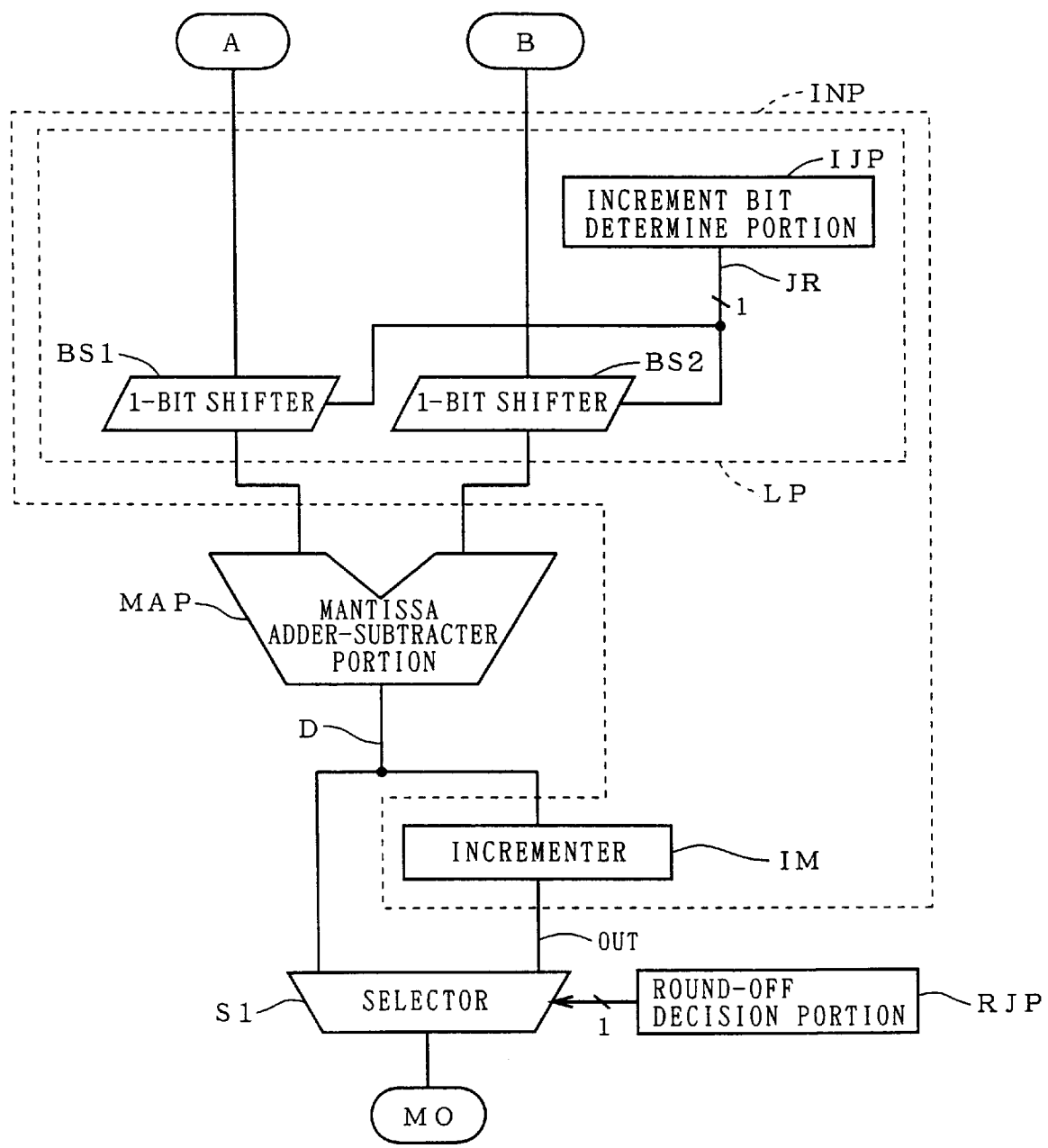
FIG. 13 is a block diagram showing an example of a floating-point arithmetic unit according to a fourth preferred embodiment of the present invention.

FIG. 13 is a block diagram showing the structure of a floating-point arithmetic unit according to a fourth preferred embodiment of the present invention. In FIG. 13, BS1 and BS2 denote one-bit shifters. The one-bit shifters BS1 and BS2 receive the mantissa data A and B and the determination result JR from the increment bit determination portion IJP before the mantissa data A and B are inputted to the mantissa adder-subtracter portion MAP. When the determination result JR from the increment bit determination portion IJP indicates effective addition, they shift the mantissa data A and B by one bit and output to the mantissa adder-subtracter portion MAP. Otherwise they output the mantissa data A and B unchanged to the mantissa adder-subtracter portion MAP without shifting. Other reference characters correspond to those described above.

In the fourth preferred embodiment, the incrementer IM has the internal structure shown in FIG. 12.

The operation can be considered in the same way as that in the third preferred embodiment for the case where the determination result JR made by the increment bit determination portion IJP indicates effective addition. Specifically, the one-bit shifters BS1 and BS2 shift the mantissa data A and B from the most significant bit side to the least significant bit side by one bit, and the incrementer IM increments D[0], and 1 is added to the exponent part data by a means not shown. Or, the one-bit shifters BS1 and BS2 may shift the mantissa data A and B from the least significant bit side to the most significant bit side by one bit when the determination result JR from the increment bit determination portion IJP indicates effective subtraction, and then the incrementer IM increments D[0], and 1 is subtracted from the exponent part data. As a result, the arithmetic results of two pieces of floating-point data are substantially the same as those in the first preferred embodiment.

According to the fourth preferred embodiment, similarly to the third preferred embodiment, it is possible to apply a known incrementer. For example, it is possible to use standard general-purpose circuit parts (building blocks) prepared for incrementers in IC design.

Fifth Preferred Embodiment

The arithmetic operations are not limited to addition and subtraction but may be multiplication. FIG. 14 is a block diagram showing the structure of a floating-point arithmetic unit according to a fifth preferred embodiment of the present invention. In FIG. 14, MM shows a mantissa multiplier portion which receives the mantissa data A and B and multiplies the data. Other reference characters correspond to those described above.

In the arithmetic result D made by the mantissa multiplier portion MM, an overflow shift may occur, or may not occur. Accordingly, the idea described in the above-described embodiments can be applied. That is, incrementation is applied to the bit in the arithmetic result D which is the LSB when it is assumed that the MSB in the arithmetic result D made by the mantissa multiplier portion MM is not shifted. In FIG. 14, the operation type includes only the multiplication, where there are only two cases, the presence and the absence of an overflow. Accordingly, the LSB specify portion LP shown in FIG. 2 is not required. As for the incrementer IM, such an incrementer as shown in FIG. 12, which has only one increment bit position, can be applied, for example.

While the invention has been described in detail, the foregoing description is in all aspects illustrative and not restrictive. It is understood that numerous other modifications and variations can be devised without departing from the scope of the invention.

I claim:

1. A floating-point arithmetic unit comprising:
    an arithmetic operation portion receiving mantissa data in a first floating-point data and mantissa data in a second floating-point data, for performing arithmetic operation of the data;
    an increment portion connected to said arithmetic operation portion, receiving the arithmetic result made by said arithmetic operation portion, specifying a bit in said arithmetic result as a least significant bit (LSB) on the assumption that either no overflow shift of the most significant bit (MSB) in said arithmetic result occurs, or cancellation shift of the MSB in said arithmetic result occurs, and for applying increment to said specified LSB;
    a round-off decision portion receiving the arithmetic result made by said arithmetic operation portion, for deciding whether to round up a bit in a position one place lower than the LSB in said arithmetic result on the basis of said arithmetic result; and
    a first selector receiving the arithmetic result made by said arithmetic operation portion, the arithmetic result made by said increment portion, and the decision result made by said round-off decision portion, for selectively outputting one of the arithmetic result from said increment portion and the arithmetic result from said arithmetic operation portion in accordance with the decision result from said round-off decision portion.

2. A floating-point arithmetic unit comprising:
    an arithmetic operation portion receiving mantissa data in a first floating-point data and mantissa data in a second floating-point data, for performing arithmetic operation of the data;
    an increment portion connected to said arithmetic operation portion, receiving the arithmetic result made by said arithmetic operation portion, for applying increment to a bit in said arithmetic result which corresponds to the LSB on the assumption that either no overflow shift of the MSB in said arithmetic result or cancellation shift of the MSB in said arithmetic result occurs;
    a round-off decision portion receiving the arithmetic result made by said arithmetic operation portion, for deciding whether to round up a bit in a position one place lower than the LSB in said arithmetic result on the basis of said arithmetic result; and
    a first selector receiving the arithmetic result made by said arithmetic operation portion, the arithmetic result made by said increment portion, and the decision result made by said round-off decision portion, for selectively outputting one of the arithmetic result from said increment portion and the arithmetic result from said arithmetic operation portion in accordance with the decision result from said round-off decision portion,
    wherein said increment portion comprises an LSB specify portion for determining whether said arithmetic operation is an effective addition or an effective subtraction and specifying said LSB in accordance with the result of the determination.

3. The floating-point arithmetic unit according to claim 2, wherein said LSB specify portion comprises
    an increment bit determination portion for making said determination, and
    a second selector receiving the determination result made by said increment bit determination portion, for selectively outputting one of predetermined data for effective addition and predetermined data for effective subtraction in accordance with the determination result made by said increment bit determination portion, and
    wherein said increment portion further comprises an incrementer receiving the arithmetic result from said arithmetic operation portion and the selected result made by said second selector, for adding these results to perform said increment.

4. The floating-point arithmetic unit according to claim 2, wherein
said LSB specify portion comprises an increment bit determination portion for making said determination and selectively outputting data for effective addition or data for effective subtraction in accordance with the result of said determination, and
said increment portion further comprises an incrementer receiving the arithmetic result made by said arithmetic operation portion and an output from said increment bit determination portion, for adding them to perform said increment.

5. The floating-point arithmetic unit according to claim 4, wherein said data for effective addition selectively outputted from said increment bit determination portion is "1", and
said data for effective subtraction selectively outputted from said increment bit determination portion is "0",
and wherein said incrementer comprises a full adder receiving the least significant bit in the arithmetic result made by said arithmetic operation portion, the output from said increment bit determination portion, and "1", for generating and outputting the least significant bit in the arithmetic result of said increment portion.

6. The floating-point arithmetic unit according to claim 2, wherein said LSB specify portion comprises
an increment bit determination portion for making said determination, and
a bit shifter receiving the arithmetic result made by said arithmetic operation portion and the determination result made by said increment bit determination portion, for shifting the arithmetic result made by said arithmetic operation portion in accordance with the determination result made by said increment bit determination portion, and
wherein said increment portion further comprises an incrementer receiving the arithmetic result made by said arithmetic operation portion outputted through said bit shifter, for performing said increment.

7. The floating-point arithmetic operation unit according to claim 2, wherein said LSB specify portion comprises
an increment bit determination portion for making said determination,
a first bit shifter receiving the mantissa data in said first floating-point data and the determination result made by said increment bit determination portion, for shifting the mantissa data in said first floating-point data in accordance with the determination result made by said increment bit determination portion and outputting the shifted data to said arithmetic operation portion, and
a second bit shifter receiving the mantissa data in said second floating-point data and the determination result made by said increment bit determination portion, for shifting the mantissa data in said second floating-point data in accordance with the determination result made by said increment bit determination portion and outputting the shifted data to said arithmetic operation portion, and
wherein said increment portion further comprises an incrementer receiving the arithmetic result made by said arithmetic operation portion, for performing said increment.

8. The floating-point arithmetic unit according to claim 2, wherein
said increment portion further comprises an incrementer receiving the arithmetic result made by said arithmetic operation portion, for performing said increment, and
said arithmetic operation portion comprises
a plurality of arithmetic operation division blocks for dividing the mantissa data in said first floating-point data and the mantissa data in said second floating-point data arranged in parallel to each other in order from the least significant bit side to the most significant bit side into a plurality of bit groups, and respectively processing said plurality of bit groups, and
said incrementer comprises a plurality of increment division blocks for respectively processing arithmetic results made by said plurality of arithmetic operation division blocks.

* * * * *